(12) United States Patent  (10) Patent No.: US 8,594,282 B2
Harvey  (45) Date of Patent: *Nov. 26, 2013

(54) METHOD AND APPARATUS FOR NAVIGATION OF A DIALOGUE SYSTEM

(75) Inventor: Brent Harvey, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,957

(22) Filed: Sep. 14, 2012

(65) Prior Publication Data

US 2013/0013317 A1  Jan. 10, 2013

Related U.S. Application Data

(63) Continuation of application No. 12/617,804, filed on Nov. 13, 2009, now Pat. No. 8,358,748.

(51) Int. Cl.
*H04M 1/64* (2006.01)
*H04M 3/42* (2006.01)

(52) U.S. Cl.
USPC ................................. 379/88.04; 455/414.1

(58) Field of Classification Search
USPC ............... 455/466; 705/16, 317, 15; 709/226, 709/217, 218; 379/88.04–88.11
See application file for complete search history.

(56) References Cited

U.S. PATENT DOCUMENTS

| | | | |
|---|---|---|---|
| 5,978,773 A | 11/1999 | Hudetz et al. | |
| 6,199,048 B1 | 3/2001 | Hudetz et al. | |
| 6,993,573 B2 | 1/2006 | Hunter | |
| 8,010,623 B1 | 8/2011 | Fitch et al. | |
| 2004/0139318 A1 | 7/2004 | Fiala et al. | |
| 2006/0167790 A1 | 7/2006 | Gould et al. | |
| 2006/0258397 A1 | 11/2006 | Kaplan et al. | |
| 2008/0059323 A1 | 3/2008 | Chang et al. | |
| 2008/0104246 A1 | 5/2008 | Katz et al. | |
| 2008/0275819 A1 | 11/2008 | Rifai | |
| 2009/0094148 A1 | 4/2009 | Gilder et al. | |
| 2009/0204417 A1 | 8/2009 | Tsuria | |
| 2010/0096449 A1 | 4/2010 | Denzer et al. | |
| 2011/0057025 A1 | 3/2011 | Denzer et al. | |
| 2012/0190386 A1* | 7/2012 | Anderson | 455/456.3 |

OTHER PUBLICATIONS

CTIA Wireless Internet Caucus, "Marketing Guide for Camara-Phone Based Barcode Scanning, CTIA Code Scan Action Team Version 1.0," CTIA Wireless Internet Caucus Code Scan Action Team—Camera-Phone Barcode Scanning, © 2009 CTIA—The Wireless Association®, consists of 18 pages.

(Continued)

*Primary Examiner* — Mohammad Islam

(57) ABSTRACT

In one embodiment, the present disclosure is a method and apparatus for navigation of a dialogue system. In one embodiment, a method for facilitating navigation of a menu of a dialogue system includes encoding data including information for navigating the menu in a machine-readable data structure and outputting the machine-readable data structure.

18 Claims, 4 Drawing Sheets

(56) References Cited

OTHER PUBLICATIONS

CTIA Wireless Internet Caucus, "Camera-Phone Based Barcode Scanning, CTIA Code Scan Action Team, White Paper, Sep. 9, 2008" CTIA Wreless Internet Caucus Code Scan Action Team—Camera-phone Barcode Scanning, © 2004 CTIA—The Wireless Association™, consists of 27 pages.

CTIA Wireless Internet Caucus, "Marketing Guide for Camera-Phone Based Barcode Scanning, CTIA Code Scan Action Team Version 1.0," CTIA Wireless Internet Caucus Code Scan Action Team—Camera-Phone Barcode Scanning, © 2009 CTIA—The Wireless Association®, consists of 18 pages.

CTIA Wireless Internet Caucus, "Camera-Phone Based Barcode Scanning, CTIA Code Scan Action Team, White Paper, Sep. 9, 2008" CTIA Wireless Internet Caucus Code Scan Action Team—Camera-phone Barcode Scanning, © 2004 CTIA—The Wireless Association™, consists of 27 pages.

* cited by examiner

METHOD AND APPARATUS FOR NAVIGATION OF A DIALOGUE SYSTEM

This application is a continuation of U.S. patent application Ser. No. 12/617,804, filed Nov. 13, 2009, which is currently allowed and is herein incorporated by reference in its entirety.

FIELD OF THE INVENTION

The present invention relates generally to telecommunications and relates more particularly to dialogue systems.

BACKGROUND

Dialogue systems are computer systems that provide information over a communication device, such as a telephone. Dialogue systems are commonly used, for example, in customer support applications. For instance, a dialogue system can be used to allow customers to access information in a company's database by navigating a series of menu choices. As an example, an airline may use a dialogue system in order to provide flight-related information such as flight number, flight status, or the like.

Currently, users of dialogue systems must navigate menus by following voice prompts and speaking and/or pressing buttons or keys at the appropriate times. For example, a dialogue system that provides information on flight status may first ask the user to enter the day for which he seeks information, followed by the flight number, the cities of departure and arrival, or other information that identifies the flight. This is time-consuming and often inconvenient, as the user may have to navigate through many levels of the menu in order to obtain the information he is seeking. In addition, the user may make mistakes in entering information or in navigating the menus (e.g., enter the wrong flight number or choose "check in for flight" instead of "check flight status"), which adds to the time and frustration involved in obtaining the desired information.

SUMMARY OF THE INVENTION

In one embodiment, the present disclosure is a method and apparatus for navigation of a dialogue system. In one embodiment, a method for facilitating navigation of a menu of a dialogue system includes encoding data including information for navigating the menu in a machine-readable data structure and outputting the machine-readable data structure.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention is a method and apparatus for navigation of a dialogue system. Embodiments of the invention facilitate the navigation of dialogue system menus by encoding pertinent information, such as phone number, navigation information, and other information, in a machine readable data structure such as a bar code. The encoded information allows a user to navigate to the appropriate "destination" in the dialogue system's menu simply by scanning the data structure with a communication device.

Figure 1:
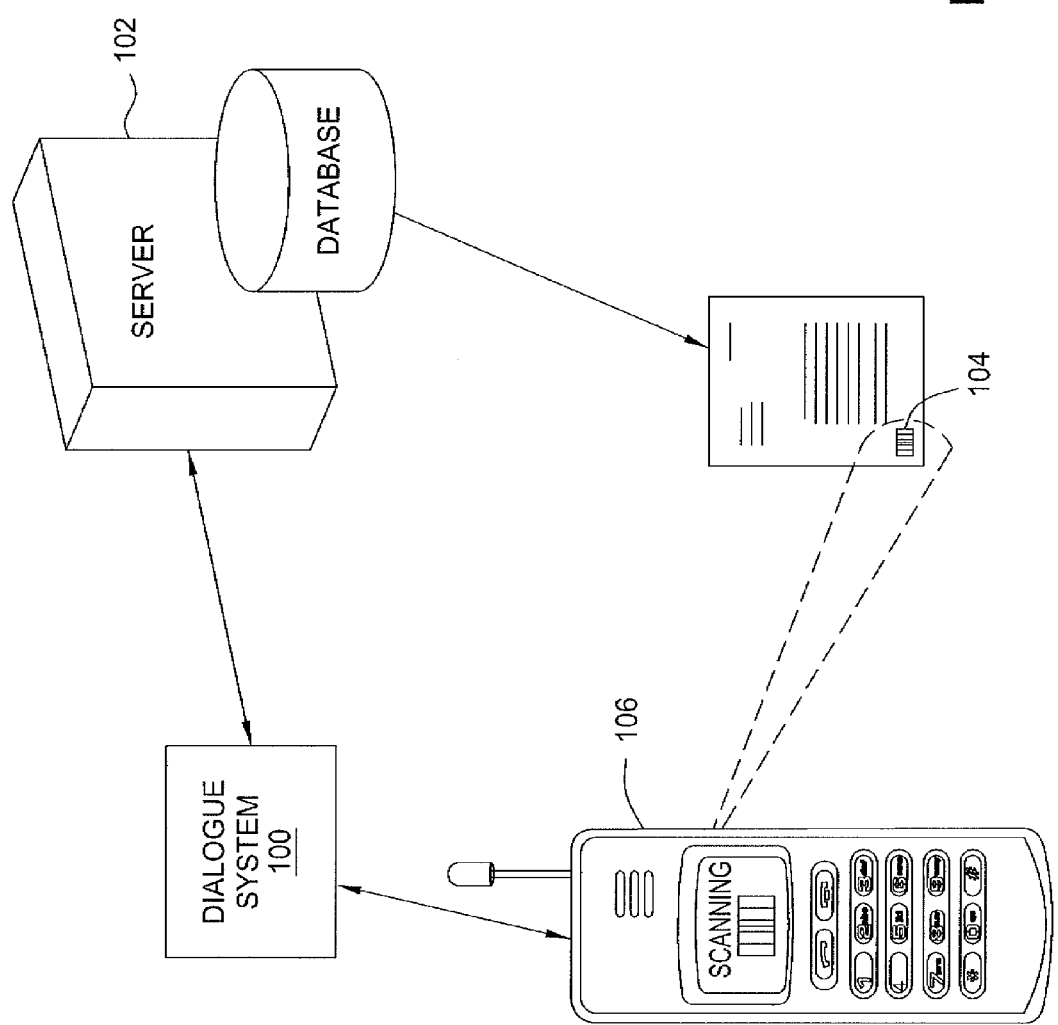
FIG. 1 is a schematic diagram illustrating one embodiment of a system for facilitating navigation of a dialogue system.

FIG. 1 is a schematic diagram illustrating one embodiment of a system for facilitating navigation of a dialogue system 100. The dialogue system 100 is a computer system that provides information of interest to human users over a communication network. For example, the dialogue system 100 may aid users in connecting to the customer support department of a service provider, such as a credit card company. Use of the dialogue system 100 involves navigating a menu by following prompts and making menu selections by speaking and/or pressing buttons or keys at the appropriate times.

As illustrated, the system further includes an application 102 that generates machine-readable data structures 104. These machine readable data structures 104 are readable, for example, by a communication device 106. Although the communication device 106 is illustrated as being a cellular telephone, the mobile device could, in fact, be any communication device capable of reading machine-readable data structures, such as a landline telephone, a cellular telephone, a smart phone, a personal computer, a personal digital assistant, a gaming console, a global positioning system, a remote control, or the like.

The application 102 includes, for example, a server that hosts the application 102 and a database that stores information accessible by the application 102. The database may be a local database or a remote database. The application 102 uses the information stored in the database to generate the machine-readable data structures 104. The information stored in the database relates to the dialogue system 100. In one embodiment, the information stored in the database includes at least one of: information by which the dialogue system 100 is accessed (e.g., telephone number, Internet protocol address, text messaging number, email address, or the like), information for navigating a menu of the dialogue system 100 (e.g., interactive voice response navigation information), information about users of a product or service associated with the dialogue system 100 (e.g., user account numbers, user contact information), and information about products or services associated with the dialogue system 100 (e.g., product numbers, stock-keeping units, flight numbers), and/or other identifying information.

The machine-readable data structure 104 encodes or maps at least some of the information contained in the database of the application 102 in a form that is readable by machines equipped with the proper reading capabilities. For example, in one embodiment, the machine-readable data structure 104 is a bar code that is readable by a bar code scanner embedded in the communication device 106. Within the context of the present invention, a "bar code" is understood to refer not only to traditional one-dimensional bar codes (i.e., which represent data in the form of parallel lines of varying width and spacing) but also to two-dimensional matrix codes (e.g., which may represent data in the form of patterns such as polygons, dots, or other geometric patterns). In a further embodiment, the machine-readable data structure further encodes instructions that cause or enable the communication device 106 to carry out certain actions, such as placing a call to the dialogue system 100.

When the machine-readable data structure 104 is scanned by the communication device 106, the communication device 106 is provided with information that allows it to automatically self-navigate to a particular destination within the menu of the dialogue system 100 (i.e., without intervention or input from the user). In one embodiment, scanning of the machine-readable data structure 104 also initiates or triggers a call to the dialogue system 100, in accordance with instructions encoded in the machine-readable data structure 104.

For example, a credit card company may print a bar code on a customer's credit card statement. If the customer has a question about his statement, he may scan the bar code with his cellular telephone, which is equipped with a bar code scanner. Scanning the bar code causes the cellular telephone to place a call to the credit card company's customer support phone number, which is implemented through an interactive voice response system. Information encoded in the bar code enables the cellular telephone to self-navigate through the menu of the interactive voice response system to the appropriate destination (e.g., a representative within the credit card company's billing department).

Additionally, the bar code may encode customer-specific information such as name, account number, balance, last payment made, or the like, to expedite location of the customer's data by the interactive voice response system or a person on the other end of the call (e.g., the representative). In this way, the customer's needs are addressed in a manner that is both efficient and convenient for the customer. The customer does not need to navigate through a lengthy and potentially confusing menu. In addition, errors associated with the input of information are substantially reduced.

In one embodiment, at least some of the data encoded in the machine readable data structure 104 is encrypted prior to being encoded in the machine readable data structure 104. Encryption may be desirable, for example, to protect sensitive or private information (e.g., account numbers, addresses, or the like). In this case, a server associated with the dialogue system 100 may decrypt the encrypted data to facilitate navigation of the menu.

Figure 2:
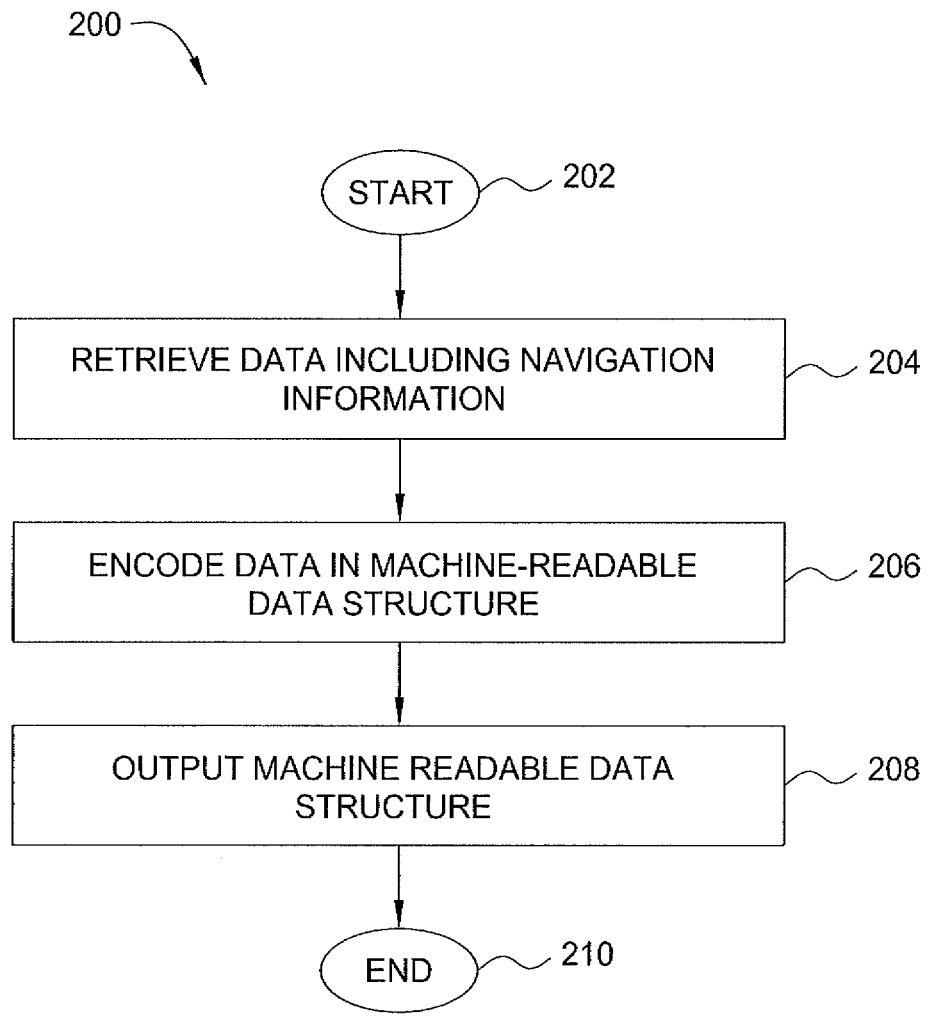
FIG. 2 is a flow diagram illustrating one embodiment of a method for encoding dialogue system navigation information in a machine-readable data structure, according to the present invention.

FIG. 2 is a flow diagram illustrating one embodiment of a method 200 for encoding dialogue system navigation information in a machine-readable data structure, according to the present invention. The method 200 may be implemented, for example, by the application 102 illustrated in FIG. 1. As such, discussion of the method 200 makes reference to the system illustrated in FIG. 1. However, it will be appreciated that the method 200 is not limited to use with the system of FIG. 1 and may, in fact, be advantageously implemented within systems having alternate configurations.

The method 200 is initialized at step 202 and proceeds to step 204, where the application 102 retrieves data from a database. The data includes information for navigating a menu of the dialogue system 100 (e.g., interactive voice response navigation information). In a further embodiment, the data includes information by which the dialogue system 100 is accessed (e.g., telephone number, Internet protocol address, text messaging number, email address, or the like). In a further embodiment still, the data further includes information about users of a product or service associated with the dialogue system 100 (e.g., user account numbers, user contact information, and/or other identifying information), information about products or services associated with the interactive dialogue system 100 (e.g., product numbers, stock-keeping units, flight numbers, and/or other identifying information), or other information.

In step 206, the application 102 encodes or maps the retrieved data in a machine-readable data structure 104, such as a bar code. The retrieved data is encoded in a manner that allows a communication device 106 to self-navigate to a particular destination within a menu of the dialogue system 100 simply by scanning the machine-readable data structure 104. In one embodiment, encoding of the retrieved data includes encrypting at least some of the retrieved data prior to the encoding.

The application 102 then outputs the machine-readable data structure 104 in step 208. In one embodiment, the machine readable data structure 104 is output to a document, such as a piece of correspondence (e.g., a credit card statement or other correspondence), a receipt, a feedback request form, a sales or informational brochure, a movie poster, a flyer, or product packaging (e.g., for medication). This document may be a paper document, a digital document, or any other sort of visual document (e.g., displayed on a screen or a monitor if a user is visiting a website maintained by a service provider) that can be scanned for data. The method 200 terminates in step 210.

Figure 3:
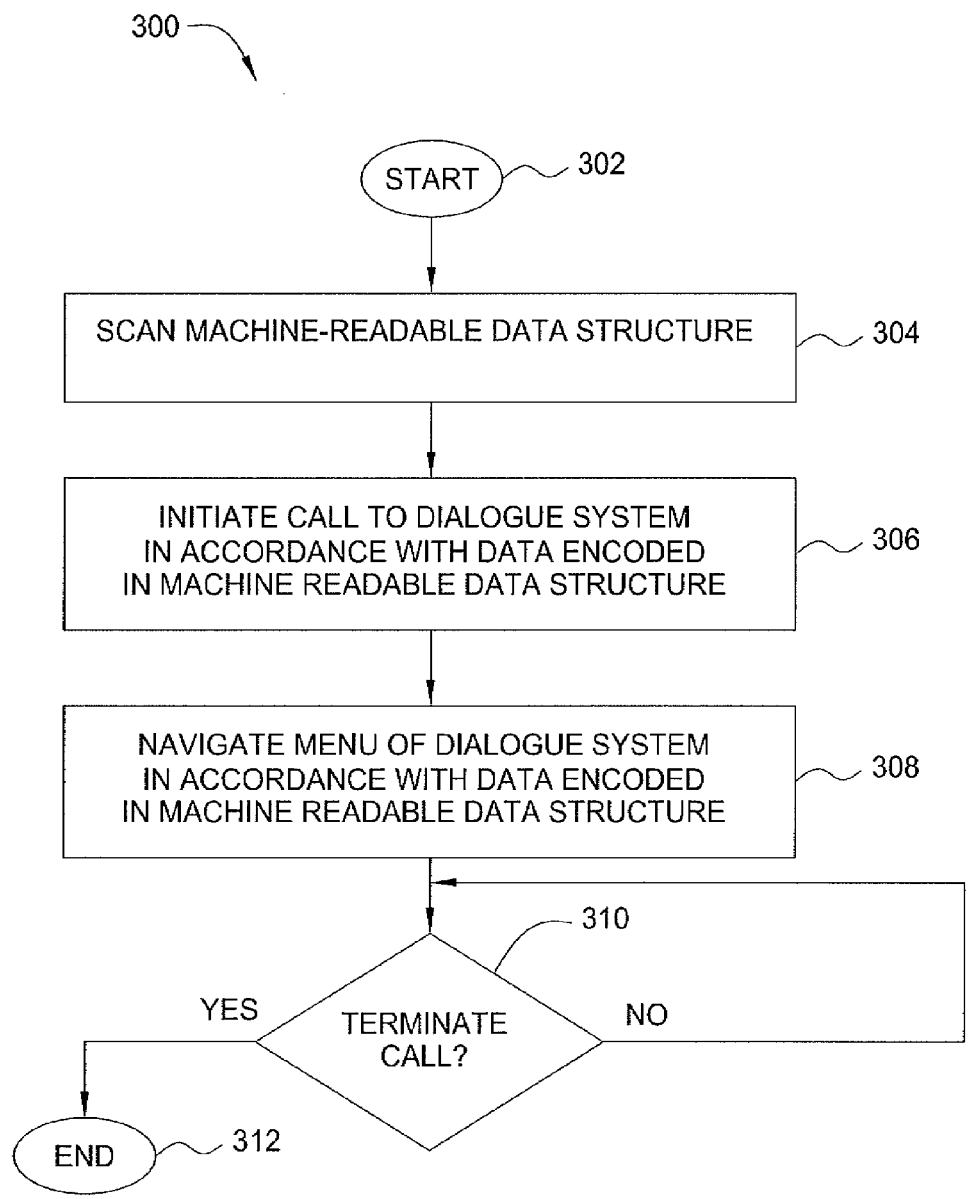
FIG. 3 is a flow diagram illustrating one embodiment of a method for navigating a dialogue system, according to the present invention.

FIG. 3 is a flow diagram illustrating one embodiment of a method 300 for navigating a dialogue system, according to the present invention. The method 300 may be implemented, for example, by the communication device 106 illustrated in FIG. 1. As such, discussion of the method 300 makes reference to the system illustrated in FIG. 1. However, it will be appreciated that the method 300 is not limited to use with the system of FIG. 1 and may, in fact, be advantageously implemented within systems having alternate configurations.

The method 300 is initialized at step 302 and proceeds to step 304, where the communication device 106 scans a machine-readable data structure 104. In one embodiment, the machine readable data structure 104 is printed on a document (e.g., a credit card statement or displayed on a screen).

In step 306, the communication device 106 initiates a call to a dialogue system 100, in accordance with data encoded in the machine-readable data structure 104. In particular, the communication device 106 initiates a call to a telephone number, internet protocol address, text messaging number, email address, or other contact means encoded in the machine-readable data structure 104. In one embodiment, the call is initiated automatically by the communication device 106 in accordance with instructions encoded in the machine-readable data structure 104.

In step 308, the communication device 106 navigates a menu of the dialogue system 100, in accordance with data encoded in the machine-readable data structure 104. In particular, the communication device 106 navigates to a destination in the menu that is specified by the data encoded in the machine-readable data structure 104 (e.g., the billing department of a credit card company). In one embodiment, the communication device navigates the menu by selecting options specified in the data encoded in the machine-readable data structure 104 each time the menu presents a choice. For example, if the menu presents a choice of "Select 1 for English, or select 2 for Spanish," the data encoded in the machine readable data structure 104 causes the communication device to respond in a manner that selects the appropriate language.

In step 310, the communication device 106 determines whether to terminate the call. If the communication device concludes in step 310 that the call should be terminated (e.g., a user ending a call), the method 300 terminates in step 312

(e.g., by disconnecting the call). Alternatively, if the communication device concludes in step 310 that the call should not be terminated, then the communication device 106 returns to step 310 and continues to navigate the menu of the dialogue system 100 in accordance with data encoded in the machine-readable data structure 104, until the call is to be terminated.

It should be noted that although not specifically specified, one or more steps of methods 200 and 300 may include a storing, displaying and/or outputting step as required for a particular application. In other words, any data, records, fields, and/or intermediate results discussed in the methods 200 and 300 can be stored, displayed and/or outputted to another device as required for a particular application. Furthermore, steps or blocks in FIGS. 2 and 3 that recite a determining operation, or involve a decision, do not necessarily require that both branches of the determining operation be practiced. In other words, one of the branches of the determining operation can be deemed as an optional step.

The present invention may be advantageously implemented in a variety of applications. For example, as discussed above, embodiments of the invention can greatly simplify customer service applications. However, embodiments of the invention can also be implemented in public safety or health applications as well, where timely provision of information can be critical. For example, the packaging for a poisonous or hazardous product could have a machine-readable data structure printed thereon that embeds the contact information for a local poison control center, along with pertinent information about the product itself.

Figure 4:
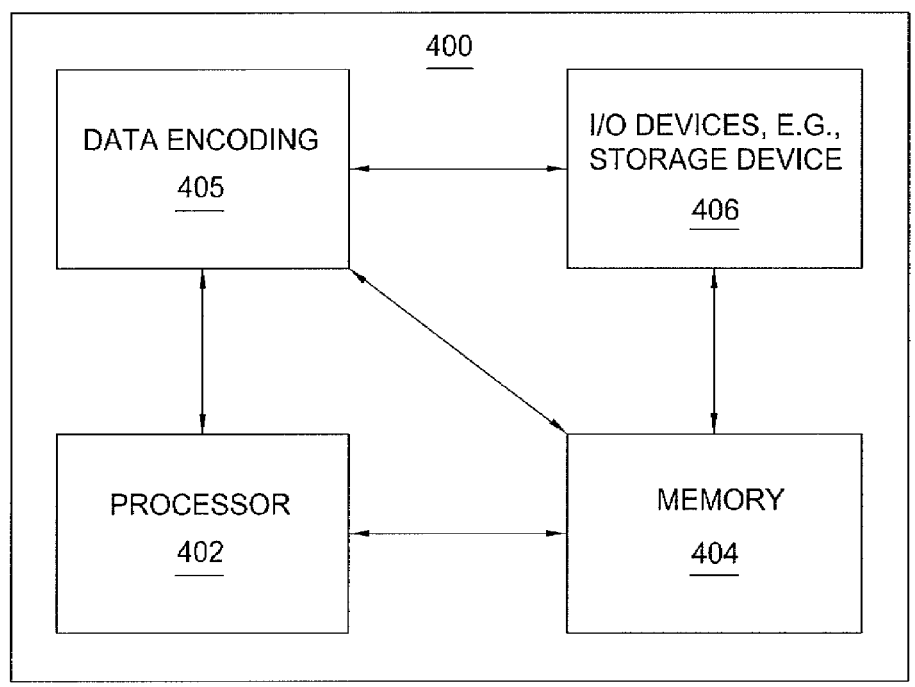
FIG. 4 is a high level block diagram of the data encoding method that is implemented using a general purpose computing device.

FIG. 4 is a high level block diagram of the data encoding method that is implemented using a general purpose computing device 400. In one embodiment, a general purpose computing device 400 comprises a processor 402, a memory 404, a data encoding module 405 and various input/output (I/O) devices 406 such as a display, a keyboard, a mouse, a modem, a stylus, a joystick, a keypad, controller, a barcode scanner, and the like. In one embodiment, at least one I/O device is a storage device (e.g., a disk drive, an optical disk drive, a floppy disk drive). It should be understood that the data encoding module 405 can be implemented as a physical device or subsystem that is coupled to a processor through a communication channel.

Alternatively, the data encoding module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the data encoding module 405 for encoding dialogue system navigation information in a machine-readable data structure described herein with reference to the preceding Figures can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for facilitating navigation of a menu of a dialogue system, the method comprising:
    encoding, by a processor, data comprising information for navigating the menu in a machine-readable data structure; and
    outputting, by the processor, the machine-readable data structure, wherein the information enables a communication device to scan the machine-readable data structure to self-navigate through the menu, wherein the information is used for navigating a call to a specified destination in the menu having a plurality of destinations.

2. The method of claim 1, where the data further comprises: information by which the dialogue system is accessed.

3. The method of claim 1, where the data further comprises: information about a user communicating with the dialogue system.

4. The method of claim 1, where the data further comprises: information about a product associated with the dialogue system.

5. The method of claim 1, where the data further comprises: an instruction that causes the communication device to carry out an action.

6. The method of claim 1, where the data further comprises: information about a service associated with the dialogue system.

7. A non-transitory computer readable storage medium containing an executable program for facilitating navigation of a menu of a dialogue system which, when executed by a processor, causes the processor to perform operations, the operations comprising:
    encoding data comprising information for navigating the menu in a machine-readable data structure; and
    outputting the machine-readable data structure, wherein the information enables a communication device to scan the machine-readable data structure to self-navigate through the menu, wherein the information is used for navigating a call to a specified destination in the menu having a plurality of destinations.

8. The non-transitory computer readable storage medium of claim 7, where the data further comprises: information by which the dialogue system is accessed.

9. The non-transitory computer readable storage medium of claim 7, where the data further comprises: information about a user communicating with the dialogue system.

10. The non-transitory computer readable storage medium of claim 7, where the data further comprises: information about a product associated with the dialogue system.

11. The non-transitory computer readable storage medium of claim 7, where the data further comprises: an instruction that causes the communication device to carry out an action.

12. The non-transitory computer readable storage medium of claim 7, where the data further comprises: information about a service associated with the dialogue system.

13. A system for facilitating navigation of a menu of a dialogue system, the system comprising:
- a processor; and
- a computer readable medium storing an executable program which, when executed by the processor, causes the processor to perform operations, the operations comprising:
  - encoding data comprising information for navigating the menu in a machine-readable data structure; and
  - outputting the machine-readable data structure, wherein the information enables a communication device to scan the machine-readable data structure to self-navigate through the menu, wherein the information is used for navigating a call to a specified destination in the menu having a plurality of destinations.

14. The system of claim 13, where the data further comprises: information by which the dialogue system is accessed.

15. The system of claim 13, where the data further comprises: information about a user communicating with the dialogue system.

16. The system of claim 13, where the data further comprises: information about a product associated with the dialogue system.

17. The system of claim 13, where the data further comprises: an instruction that causes the communication device to carry out an action.

18. The system of claim 13, where the data further comprises: information about a service associated with the dialogue system.

\* \* \* \* \*